US007867600B2

(12) United States Patent
Makimura et al.

(10) Patent No.: US 7,867,600 B2
(45) Date of Patent: Jan. 11, 2011

(54) DEODORANT SUEDE-TONE-LEATHER-LIKE SHEET

(75) Inventors: Masaru Makimura, Okayama (JP); Norio Makiyama, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 1112 days.

(21) Appl. No.: 11/587,486

(22) PCT Filed: Apr. 26, 2005

(86) PCT No.: PCT/JP2005/007879

§ 371 (c)(1), (2), (4) Date: Oct. 26, 2006

(87) PCT Pub. No.: WO2005/103365

PCT Pub. Date: Nov. 3, 2005

(65) Prior Publication Data

US 2007/0212962 A1 Sep. 13, 2007

(30) Foreign Application Priority Data

Apr. 27, 2004 (JP) ............................ 2004-131194

(51) Int. Cl.
*B32B 3/00* (2006.01)

(52) U.S. Cl. ...................................... 428/151; 442/168

(58) Field of Classification Search .................. 428/85, 428/87, 91, 96, 903, 905, 151; 442/96, 101, 442/123, 124, 148, 154, 340, 347, 351, 353
See application file for complete search history.

(56) References Cited

U.S. PATENT DOCUMENTS 6,592,858 B1 * 7/2003 Honda et al. ............... 424/76.1

FOREIGN PATENT DOCUMENTS

| | | |
|---|---|---|
| JP | 8-74171 | 3/1996 |
| JP | 10-280270 | 10/1998 |
| JP | 11 100778 | 4/1999 |
| JP | 2002 242082 | 8/2002 |

* cited by examiner

*Primary Examiner*—Arti Singh-Pandey
(74) *Attorney, Agent, or Firm*—Oblon, Spivak, McClelland, Maier & Neustadt, L.L.P.

(57) ABSTRACT

A suede-type leather-like sheet having excellent appearance and exhibiting an excellent deodorizing effect and a soft feel in combination without agglomeration of napped fibers or deterioration in the appearance (whitening) due to the deodorant is provided. The deodorant suede-type leather-like sheet comprises a fiber-entangled fabric comprising a microfine fiber and a particulate deodorant, wherein the surface area of the microfine fiber per the unit volume of the fiber-entangled fabric is $3\times10^3$ to $9\times10^4$ $cm^2/cm^3$, and at least a portion of the deodorant having an average diameter of primary particles of 0.1 μm or smaller is present on the surface of the microfine fiber.

9 Claims, No Drawings

DEODORANT SUEDE-TONE-LEATHER-LIKE SHEET

TECHNICAL FIELD

The present invention relates to a deodorant suede-type leather-like sheet which is used for linings and insertion sheets of shoes, gloves, clothes and furniture and effective for removing bad smell derived from the environment of living.

BACKGROUND ART

Various fabrics having the deodorizing effect have heretofore been proposed to remove bad smell derived from sweat and smell of people, cigarettes and pet animals. For example, an insertion sheet for shoes using a fiber formed with a polymer containing a combination of a carboxylic acid and a transition metal salt is proposed as the deodorant insertion sheet for shoes (refer to Patent Reference 1). However, when the sheet is impregnated with an elastic polymer to enhance with tear strength and the abrasion strength, the surface of the fiber in the sheet is coated with the polymer, and the deodorant property decreases since the deodorant is mixed into the fiber in this insertion sheet of shoes. When the surface of the fiber is kept exposed, a problem arises in that the abrasion resistance of the surface decreases.

A deodorant moisture-permeable water-proof fabric in which a finely porous resin coating film formed on the surface of a fabric contains a substance exhibiting the deodorant property and the fraction of pores is 20 to 70% as obtained in accordance with a specific equation is proposed (refer to Patent Reference 2). However, this fabric cannot be applied to the suede-type leather-like sheet.

A fibrous fabric having a photo-catalyst of titanium oxide fixed in the fibrous fabric with a resin binder is proposed (refer to Patent Reference 3). However, this fabric has a drawback in that obtaining a fabric having a soft feel is difficult since the fibrous fabric is fixed with the resin binder, and fibers are fixed to each other.

An antibacterial suede-type artificial leather composed of an elastic polymer and an entangled nonwoven fabric comprising fiber bundles, in which medium microfine fiber (A) which contains particles of a phosphoric acid salt holding an ion of a metal such as silver and zinc and having an average diameter of 1 μm or smaller (substantially about 0.5 μm) and has a diameter of the fiber of 3 to 10 μm and microfine fiber (B) having a diameter of 1 μm or smaller are mixed in specific relative amounts, and exhibiting excellent appearance and durability is proposed (refer to Patent Reference 4). However, the artificial leather proposed in Patent Reference 4 has a problem in that the appearance tends to be deteriorated since the particles of the deodorant have great diameters and napped fibers tend to be agglomerated (i.e., formation of thick stumps of fibers by agglomeration of napped fibers), and that the appearance of the surface tends to be whitened when a sufficient amount of the antibacterial agent is provided.

An antibacterial deodorant fiber in which fine particles of titanium oxide supporting silver are attached to the surface without placing a resin binder between the surface and the particles is proposed (refer to Patent Reference 5). However, this fiber has a problem in that obtaining a sufficient deodorizing effect from a suede-type leather-like sheet obtained by using the above microfine fiber is difficult when the amount of the attached deodorant is small although it is described that the fiber exhibits excellent antibacterial and deodorant functions, shows little decrease in the feel and has the resistance to laundering.

Patent Reference 1: Japanese Patent Application Laid-Open No. Heisei 02(1990)-63403

Patent Reference 2: Japanese Patent Application Laid-Open No. Heisei 01(1989)-280073

Patent Reference 3: Japanese Patent Application Laid-Open No. Heisei 08(1996)-074171

Patent Reference 4: Japanese Patent Application Laid-Open No. Heisei 06(1994)-346376

Patent Reference 5: Japanese Patent Application Laid-Open No. Heisei 10(1998)-280270

DISCLOSURE OF THE INVENTION

The present invention has an object of providing a deodorant suede-type leather-like sheet which exhibits excellent deodorizing effect for removing bad smell derived from sweat and smell of people, cigarettes and pet animals, soft feel of the natural leather-like tone and elegant appearance of napped fibers.

As the result of intensive studies by the present inventors to achieve the above object, it was found that the above object could be achieved when the surface area of a microfine fiber per the unit volume of a fiber-entangled fabric containing the microfine fiber was within a specific range, and at least a portion of a particulate deodorant was present on the surface of the microfine fiber.

The present invention provides a deodorant suede-type leather-like sheet as described in the following:

(1) A deodorant suede-type leather-like sheet which comprises a fiber-entangled fabric comprising a microfine fiber and a particulate deodorant, wherein a surface area of the microfine fiber per a unit volume of the fiber-entangled fabric is $3\times10^3$ to $9\times10^4$ $cm^2/cm^3$, and at least a portion of the deodorant having an average diameter of primary particles of 0.1 μm or smaller is present on a surface of the microfine fiber;

(2) A deodorant suede-type leather-like sheet described in (1), wherein the fiber-entangled fabric comprises an elastic polymer in an amount of 0 to 150% by mass of the fiber entangled fabric in a space formed with entanglements;

(3) A deodorant suede-type leather-like sheet described in any one of (1) and (2), wherein the fiber-entangled fabric comprises fiber bundles of the microfine fiber;

(4) A deodorant suede-type leather-like sheet described in any one of (1) and (2), wherein the deodorant is an inorganic photo-semiconductor;

(5) A deodorant suede-type leather-like sheet described in any one of (1) and (2), wherein at least a portion of the deodorant is present in a manner such that the deodorant covers a surface of the microfine fiber;

(6) A deodorant suede-type leather-like sheet described in any one of (1) and (2), wherein an amount of the deodorant is 0.001 to 0.05 $g/cm^3$ per a unit volume of the fiber-entangled fabric; and (7) A deodorant suede-type leather-like sheet described in any one of (1) and (2), which has a surface of napped fibers on at least one face of a base fabric of the leather-like sheet which comprises the fiber-entangled fabric comprising a microfine fiber or a base fabric of the leather-like sheet which comprises the fiber-entangled fabric comprising a microfine fiber and the elastic polymer.

In accordance with the present invention, a deodorant suede-type leather-like sheet which exhibits excellent deodorizing effect for removing bad smell derived from sweat and smell of people, cigarettes and pet animals and has soft feel and appearance of the natural leather-like tone can be provided. Since the suede-type leather-like sheet of the present invention does not cause deterioration in the appearance (whitening) due to agglomeration of napped fibers or the presence of the deodorant, the sheet can be advantageously used for clothes, interior furnishings, shoes, bags and various types of gloves.

THE MOST PREFERRED EMBODIMENT TO CARRY OUT THE INVENTION

The deodorant suede-type leather-like sheet of the present invention comprises a fiber-entangled fabric comprising a microfine fiber and a particulate deodorant, wherein the surface area of the microfine fiber per the unit volume of the fiber-entangled fabric is $3\times10^3$ to $9\times10^4$ $cm^2/cm^3$, and at least a portion of the particulate deodorant having an average diameter of primary particles of 0.1 μm or smaller is present on the surface of the microfine fiber.

The fiber-entangled fabric comprising a microfine fiber can be obtained in accordance with (1) a step of producing a microfine fiber-forming fiber used for forming the microfine fiber; (2) a step of forming a web laminate from the microfine fiber-forming fiber; (3) a step of producing a fiber-entangled fabric from the web laminate; (4) a step of forming a coagulated body by impregnating the fiber-entangled fabric with an elastic polymer, (5) a step of converting the coagulated body into the microfine fiber; (6) a step of forming napped fibers on at least one face; and (7) a step of coloring and finishing the obtained base fabric having the napped fibers, where necessary. The steps of the process for producing the fiber-entangled fabric comprising a microfine fiber will be described successively in the following.

(1. Production of a Microfine Fiber-Forming Fiber)

The microfine fiber-forming fiber for forming the microfine fiber used in the present invention can be obtained by composite spinning or mix spinning of two or more types of incompatible thermoplastic polymers in accordance with a conventional process. The composite spinning means, typically, the spinning using a composite spinning nozzle of the needle pipe type as the spinning nozzle, in which two or more types of incompatible polymers are composite spun by extrusion under control at the nozzle portion of the spinneret so that the island component is extruded into the sea component. The mix spinning means the spinning comprising chip blending two or more types of incompatible polymers, followed by melt spinning the resultant blend in the same melt system.

Examples of the microfine fiber-forming fiber include composite fibers having the sectional structure of the so-called sea/island type (hereinafter, referred to as the "sea/island fibers"). Examples of the sea/island fiber include fibers of the extraction type which are obtained by removing the sea component from microfine fiber-forming fibers by dissolution or decomposition of the sea component with a solvent or a decomposing agent such as sodium hydroxide so that fibrils are formed with the residual island component, and composite fibers of the split type which are obtained by treating microfine fiber-forming fibers mechanically or with a treating agent so that fibrils are formed with the polymers of each component. Among these fibers, the fibers of the extraction type which are obtained by removing the sea component by extraction are preferable from the standpoint of the feel as the suede-type leather-like sheet.

As the polymer of the island component, a polymer which can be melt spun, sufficiently exhibits the physical properties of the fiber such as strength and has a greater melt viscosity and a greater surface tension than those of the polymer of the sea component is preferable.

Examples of the polymer of the island component include polyamide-based polymers and copolymers such as 6-nylon and 66-nylon, thermoplastic polyesters such as polyethylene terephthalate, polytrimethylene terephthalate and polybutylene terephthalate, and copolymers thereof. It is preferable that the polymer of the island component comprises various additives, where necessary. Examples of the additive include colorants such as carbon black, titanium oxide and pigments and agents providing functions such as flame retardants and agents providing light resistance.

As the polymer of the sea component of the sea/island fiber, a polymer which exhibits dissolution and decomposition behaviors different from those of the polymer of the island component and has a great solubility in a solvent or a decomposing agent used for dissolving or removing the polymer of the sea component and a small compatibility with the polymer of the island component is preferable. Examples of the polymer of the sea component include polyethylene, modified polyethylenes, polypropylene, polystyrene, modified polyesters, polyvinyl alcohol and modified polyvinyl alcohols.

It is preferable that the ratio of the amounts by volume of the sea component to the island component in the microfine fiber-forming fiber forming the microfine fiber used in the present invention, i.e., the sea/island fiber, is in the range such that the sea component/the island component=30/70 to 70/30. When the content of the sea component is 30% by volume or greater, the amount of the component removed by dissolution or decomposition is sufficient, and the sufficient flexibility can be obtained. When the content of the sea component is 70% by volume or smaller, the absolute amount of the microfine fiber comprising the polymer of the island component obtained after removal by dissolution or decomposition is suitable, and the sufficient physical properties can be surely exhibited when the leather-like sheet is prepared. An excessive increase in the amount of the component to be removed by dissolution or decomposition can be prevented, and the content is preferable from the standpoint of the productivity and the economy.

The average fineness of the microfine fiber comprising the polymer of the island component obtained after removal of the polymer of the sea component by dissolution is 1 dtex or smaller, preferably 0.2 dtex or smaller, more preferably 0.0005 to 0.07 dtex and most preferably 0.001 to 0.01 dtex. When the average fineness is 1 dtex or smaller, the adverse effect on the flexibility of the fiber-entangled fabric using the microfine fiber such as harsh touch can be prevented. When the fineness is 0.07 dtex or smaller, a suede-type of the high grade feel obtained by the covering with fine napped fibers can be exhibited. When the fineness is 0.0005 or greater, the coloring property can be surely exhibited.

(2. Production of a Web Laminate)

The microfine fiber-forming fiber can be formed into filaments or staples in accordance with a conventional process. When the staples are formed, treatments such as drawing, crimping, heat fixing and cutting are conducted after the composite spinning or the mix spinning. The staple may comprise oils such as silicone oils. Examples of the oil include silicone-based oils exhibiting the effect of decreasing friction between fibers such as polyorganosiloxanes and various types of modified silicone oils, mineral oil-based oils exhibiting the effect of adjusting the relation between fibers and decreasing friction between metals and fibers and other conventional oils such as antistatic agents. The oil is added by blending with consideration on the properties of the fiber. The blending may be conducted before the crimping of the fiber, after the crimping of the fiber or during the mixing with other fibers. Oils of different types may be used for the staples of the microfine fiber-forming fiber. Since the staples of the microfine fiber-forming fiber tend to have troubles such as winding and slitting of the fiber in the steps of carding and needle punching, it is preferable that an oil decreasing the friction coefficient is mainly provided to the microfine fiber-forming fiber.

The staples of the microfine fiber-forming fiber are formed into random webs or crosslap webs through a card or a webber in accordance with a conventional process, and a web laminate is obtained by laminating the formed webs together.

(3. Production of a Fiber-Entangled Fabric)

The web laminate obtained above is transferred to the step of needle punching, and a nonwoven fabric, which is a fiber-entangled fabric, is prepared. As the felt needle for needle punching in the step of needle punching, a conventional felt needle is used. A single barb needle effective for preventing fracture of fibers is preferable for entanglement in the direction of the thickness of the web. To increase the specific gravity of the surface of the nonwoven fabric, a needle having many barbs such as 3-barb needles, 6-barb needles and 9-barb needles may be used. These needles may be used in combination in accordance with the object.

The number of punch in the step of needle punching is different depending on the shape of the used needle and the thickness of the web. The number is set, in general, in the range of 200 to 2,500 punches/$cm^2$ and preferably in the range of 500 to 2,000 punches/$cm^2$. In general, when the condition of needle punching is excessively severe in the needle punching of a web laminate, fracture and splitting of the microfine fiber-forming fiber take place, and the entanglement is not improved. When the condition of needle punching is excessively mild, the number of the fiber arranged in the direction of thickness is insufficient, and the entanglement is not improved. Moreover, it is difficult that the beautiful suede face having a great density of napped fibers and exhibiting the high grade feel is obtained.

The web laminate treated by the needle punching is pressed in the direction of the thickness so that the surface is made smooth, the thickness is controlled, and the specific gravity of the microfine fiber in the fiber-entangled fabric in the completed suede-type leather-like sheet is controlled at the desired level. It is preferable that the specific gravity of the nonwoven fabric after being pressed is 0.18 or greater and more preferably 0.19 to 0.45. As the process for the pressing, a conventional process such as the process of passing through a plurality of heated rolls and the process of passing the preheated nonwoven fabric through cooled rolls can be used. The sea component, i.e., the component having a lower melting point such as polyethylene, in the microfine fiber-forming fiber is melted and pressed together, and the fiber-entangled fabric (nonwoven fabric) can be made smoother. In this step, it is possible that a removable adhesive such as polyvinyl alcohol, starch and a resin emulsion may be added to the fiber-entangled fabric to suppress the change in the form due to the tension or the pressure.

(4. Impregnation with an Elastic Polymer)

The fiber-entangled fabric (the nonwoven fabric) treated by the pressing is impregnated with a solution or a dispersion of an elastic polymer to form a spongy coagulated body, where desired. By the impregnation with an elastic polymer, the feel and the mechanical properties of the suede-type leather-like sheet can be adjusted to the desired level, falling-off of the microfine fibers from the leather-like sheet can be prevented, and adhesion during the formation of a coating layer to form a leather-like sheet of a nubuck type or a semi-grain-finished leather-like sheet can be improved.

As the elastic polymer, resins heretofore used for producing leather-like sheets such as polyurethane-based resins, polyvinyl chloride-based resins, polyacrylic acid-based resins, polyaminoacid-based resins, silicone-based resins, copolymers of these resins and mixtures of two or more of these resins are advantageously used. Among these elastic polymers, polyurethane-based resins are preferable from the standpoint of obtaining the natural leather-like feel and touch.

When the elastic polymer is used for the impregnation of the fiber-entangled fabric, where necessary, it is preferable that various additives such as coloring agents and agents providing functions are added to the elastic polymer in advance. Examples of the coloring agent include carbon black, titanium oxide, pigments and dyes, and examples of the agents providing functions include flame retardants, antioxidants, agents providing the light resistance, surfactants and foaming agents.

The fiber-entangled fabric is impregnated with the elastic polymer in the form of an aqueous emulsion or a solution prepared by dissolution into an organic solvent, and the elastic polymer is coagulated into a spongy form by suitably conducting the heat sensitive coagulation, the coagulation by drying or the wet coagulation. The ratio of the amount by mass of the elastic polymer to the amount by mass of the fiber-entangled fabric constituting the leather-like sheet of the present invention is 0 to 150%, preferably 5 to 150% and more preferably 10 to 125% from the standpoint of the balance between the feel, the mechanical properties and the deodorant function. When the ratio of the amounts by mass exceeds 150%, the leather-like feel becomes rubber-like feel which is, in general, disliked although the mechanical properties as the leather-like sheet and the adhesion with the surface coating layer tend to be improved. Moreover, the attachment of the deodorant to the elastic polymer markedly increases, and the attached deodorant extremely easily fall off due to the decrease in the relative amount of the microfine fiber having the deodorant, the decrease in the surface area of the microfine fiber per the unit volume of the fiber-entangle fabric, and the relative increase in the surface area of the elastic polymer.

(5. Conversion into the Microfine Fiber)

The fiber-entangled fabric obtained by the pressing or the spongy coagulate obtained by the impregnation of the fiber-entangled fabric with the elastic polymer is converted into a microfine fiber or fiber bundles of the microfine fiber (hereinafter, both referred to as the "microfine fiber") having a surface area of $3\times10^3$ to $9\times10^4$ $cm^2/cm^3$ per the unit volume of the fiber-entangled fabric by removing the polymer of the sea component. In the conversion, base fabric of the leather-like sheet [1] comprising the microfine fiber and a fiber-entangled fabric comprising the fiber bundles of the microfine fiber or base fabric of the leather-like sheet [2] comprising the microfine fiber, a fiber-entangled fabric comprising the fiber bundles of the microfine fiber and the elastic polymer is obtained by removing the polymer of the sea component from the fiber-entangled fabric or the spongy coagulate by dissolution or decomposition using a liquid which is a non-solvent for the polymer of the island component and a solvent or a decomposing agent for the polymer of the sea component.

When the surface area of the microfine fiber per the unit volume of the fiber-entangled fabric is in the range of $3\times10^3$ to $9\times10^4$ $cm^2/cm^3$, the object of the present invention can be sufficiently achieved. It is preferable that the surface area of the microfine fiber per the unit volume of the fiber-entangled fabric is in the range of $4\times10^3$ to $7\times10^4$ $cm^2/cm^3$. When the surface area is smaller than $3\times10^3$ $cm^2/cm^3$, the sufficient effect of the deodorization and the dense and excellent appearance of napped fibers are not obtained. When the surface area exceeds $9\times10^4$ $cm^2/cm^3$, the color forming property deteriorates, and the suede-type of the high grade feel cannot be obtained. Therefore, a surface area outside the above range is not preferable.

The thickness of base fabric of the leather-like sheet [1] and base fabric of the leather-like sheet [2] can be suitably selected in accordance with the application and is not particularly limited. The thickness is, in general, about 0.3 to 3 mm and preferably about 0.5 to 2.5 mm.

(6. Formation of Napped Fibers)

To prepare the suede-type leather-like sheet, at least one face of base fabric of the leather-like sheet [1] or [2] described above is subjected to the napping treatment, and the face of napped fibers comprising mainly the microfine fiber is formed. Examples of the process for forming the face of napped fibers include the buffing treatment with sand paper or the like and the napping treatment using needle cloths which are conducted before or after the thickness of the base fabric is adjusted at the desired value. When the above treatment is conducted before the adjustment of the thickness, the thickness is adjusted at the desired value after the treatment, and the suede-type leather-like sheet can be obtained.

(7. Coloring and Finishing of the Base Fabric Having the Napped Fibers)

As the process for coloring the obtained suede-type leather-like sheet, dyeing by dipping using a conventional dyeing machine such as Wince, Dashline and Circular machines is preferable.

As the dye used for the coloring, a dye which can color polyamide microfine fibers and a polyurethane such as an acid dye and a metal complex dye is preferable, and a metal complex dye of the 2:1 type is more preferable. It is preferable that the bottoming with a dye which does not decrease the washing fastness such as a sulfur dye and a vat dye is conducted before the dyeing using the metal complex dye of the 2:1 type. When the concentration of the dye is greater in the dyeing, a deeper color can be obtained, but the washing fastness tends to decrease. Therefore, it is preferable that the concentration of the dye is 3% or smaller. It is also preferable for improving the washing fastness that the sheet obtained after the dyeing is subjected to the brushing treatment in the wet condition.

The dyed suede-type leather-like sheet is subjected to the finishing treatments such as the treatment to provide light resistance, the crumpling, the softening treatment and the brushing, where necessary, and a suede-type leather-like sheet in the sheet form having napped fibers can be prepared as the product.

(Deodorant)

As the deodorant used in the present invention, any deodorants can be used as long as the deodorant has an average diameter of primary particles of 0.1 μm or smaller. Charcoals such as active charcoal and charcoals obtained by calcining a plant such as Japanese oak, red pine, oak and bamboo, deodorants of the physical adsorption type having the ability of physical adsorption such as silica and deodorants of the photo-catalyst type can be used. Examples of the deodorant of the photo-catalyst type include deodorants in the finely particulate form which exhibit the photo-catalytic function, i.e., generating active oxygen under irradiation with light such as ultraviolet light, decomposing many harmful substance and substances having bad smell by oxidation and working as the photo-oxidation catalyst, such as metal/phthalocyanine catalysts.

The deodorant of the photo-catalyst type is preferable. When the deodorant of the photo-catalyst type is used, the effect of deodorization (or the effect of removing odor) can be maintained for a long time since not only the deodorizing effect due to the simple adsorption such as the effect exhibited with the deodorants of the physical adsorption type, but also the fundamental deodorizing effect utilizing the decomposition under the catalytic action can be obtained. It is also preferable that the deodorant of the photo-catalyst type and the deodorant of the physical adsorption type are used in combination.

As the deodorant of the photo-catalyst type, any of organic semiconductor and inorganic semiconductors can be used. Inorganic semiconductors are preferable from the standpoint of stability, availability and handling, and inorganic semiconductors in the form of fine particles are more preferable. Examples of the deodorant used in the present invention include sulfide semiconductors, metal chalcogenides and oxide semiconductors. The examples also include GaAs, Si and Se. The deodorant may be used singly or in combination of two or more.

Among the deodorants of the photo-catalyst type, sulfide semiconductors such as CdS and ZnS and oxide semiconductors such as $TiO_2$, ZnO, $WO_3$ and $SnO_2$ are preferable, and oxide semiconductors such as $TiO_2$ and ZnO are more preferable. It is preferable that the oxide semiconductor supports a metal component having the deodorizing function such as gold, silver, copper and zinc. The crystal structure of the photo-semiconductor constituting the deodorant of the photo-catalyst type is not particularly limited. For example, the crystal structure of $TiO_2$ may be any of the anatase type, the brookite type, rutile type and the amorphous type. $TiO_2$ of the anatase type is preferable.

It is necessary that at least a portion of the deodorant described above is present on the surface of the microfine fiber in the suede-type leather-like sheet. It is preferable that at least a portion of the deodorant is present in a manner such that the deodorant covers the surface of the microfine fiber.

In the present specification, the "presence" is a concept including the attachment and the adsorption, and the "covering" means that the deodorant is present on the entire surface of the microfine fiber.

The surface of the microfine fiber constituting the fiber-entangled fabric has an extremely greater area per the unit volume, in particular, than conventional fibers having a fineness of 2 dtex or greater. Due to the presence of the deodorant on the surface having the great area, the frequency of contact between the deodorant and substances having bad smell is remarkably increased in comparison with the case where the deodorant is present on the surface of a conventional fiber, and the deodorizing effect can be increased extremely effectively. Moreover, the microfine fiber itself has a remarkably greater ability of physical adsorption than the fiber having an ordinary fineness. When a fiber having an ordinary fineness is used, a time lag is existing before the deodorant of the photo-catalyst type works effectively to exhibit the deodorizing effect, and the deodorizing effect expected from the used amount of the photo-catalyst is not exhibited immediately. This problem can be overcome by using the microfine fiber.

As the process for making at least a portion of the deodorant present on the surface of the microfine fiber, it is preferable that the deodorant is directly brought into contact with the surface of the microfine fiber. Since base fabrics of the leather-like sheet [1] and [2] described above comprise the microfine fiber having an extremely great surface area per unit volume, falling-off of the deodorant from the surface of the fiber does not easily take place even when the physical adsorption is the major function. Therefore, substantially no binder resins are required. The microfine fibers are not fixed to each other to an excessive degree, and the extreme hardening of the feel as the leather-like sheet can be prevented. In particular, it is most effective for exhibiting the deodorizing effect and maintaining the deodorizing effect that the deodorant is directly brought into contact with the surface of the fiber bundles of the microfine fiber.

In contrast, the deodorizing effect is markedly decreased when the surface area of the fiber constituting the leather-like sheet is smaller than $3\times10^3$ $cm^2/cm^3$ per the unit volume of the fiber-entangle fabric even when the deodorant is in a finely particulate form. For example, in the case of a fiber having an ordinary fineness of 2 dtex or greater or a thread comprising the fiber, conversion of the finely particulate deodorant present on the fiber into secondary particles by aggregation and association rapidly proceeds due to the small surface area per the unit volume, and the surface area of the deodorant itself is markedly decreased. As the result, not only the deodorizing effect per the amount of the deodorant is markedly decreased, but also covering of the surface of the fiber with the deodorant cannot be achieved. Even when the amount of the finely particulate deodorant necessary for exhibiting the practically effective deodorizing function in the present case is approximately the same as that in the case of the microfine fiber described above, the amount of the finely particulate deodorant required for the presence per unit surface area of the fiber increases. Therefore, whitening and agglomeration of the napped fibers due to the deodorant tend to take place on the surface, and the suede-type appearance is adversely affected to a great degree. Moreover, since it is necessary that the deodorant be fixed to the surface of the fiber of the leather-like sheet with a binder resin so that the deodorant is not falling off from the surface of the fiber, fibers are fixed to each other or the fiber and the resin in the leather-like sheet are fixed to each other with the binder resin, and the feel becomes hard. When the deodorant is made present selectively on the surface of the leather-like sheet alone by coating, it is necessary that the deodorant be fixed with a binder. The appearance of the surface changes, and the soft feel cannot be obtained.

It is preferable that the diameter of the particles of the finely particulate deodorant has a value making the deodorant present on the surface in a manner such that the deodorant uniformly covers the surface utilizing the physical adsorption. It is preferable that the diameter is the same as or smaller than the diameter of the microfine fiber used in the present invention.

The upper limit of the diameter of the particle of the finely particulate deodorant is different depending on the diameter of the microfine fiber. The average diameter of the primary particle which can be present on the surface of the microfine fiber is 0.1 μm or smaller, preferably 0.001 to 0.05 μm and more preferably 0.001 to 0.02 μm. Therefore, it is preferable that the deodorant comprises 30% by mass or greater of fine particles having a diameter of 0.05 μm or smaller so that the average particle diameter is adjusted to 0.1 μm or smaller. By using the combination of the deodorant having an average diameter of the primary particles in the above range and the fiber-entangled fabric having the surface area of the microfine fiber in the range of $3\times10^3$ to $9\times10^4$ $cm^2/cm^3$ per the unit volume of the fiber-entangled fabric, the deodorizing function (the effect and the maintenance of the effect) is improved remarkably and, at the same time, the appearance of the elegant suede-type can be exhibited without agglomeration of napped fibers or whitening of the surface of the suede.

To obtain the deodorant leather-like sheet by making the finely particulate deodorant present on base fabric of the leather-like sheet [1] or [2], it is preferable that the liquid of the dispersion medium is removed after a treating fluid in which the finely particulate deodorant is dispersed is applied to base fabric of the leather-like sheet [1] or [2].

Since it is necessary that the finely particulate deodorant be uniformly dispersed in the treating fluid, a treating fluid of an aqueous sol in which the deodorant is dispersed as colloidal particles in water used as the dispersion medium is preferable. Since the treating fluid itself is not a solvent-based fluid but an aqueous fluid, no explosion proof apparatuses are necessary in the industrial mass production, and treatments such as impregnation can be conducted without dissolution of base fabric of the leather-like sheet [1] or [2].

The amount of the deodorant is about 0.001 to 0.05 $g/cm^3$ and preferably 0.005 to 0.03 $g/cm^3$ per the unit volume of the fiber-entangled fabric comprising the microfine fiber. When the amount of the deodorant exceeds the amount necessary for covering the surface of the microfine fiber, the fine particles of the deodorant are present not only on the surface of the microfine fiber but also between the microfine fibers and between the microfine fiber and the resin as secondary particles formed by aggregation and association, and the deodorizing effect expected from the amount of the presence cannot be obtained. The secondary particles formed by aggregation and association suppress the freedom of the microfine fibers, and the feel becomes hard. The deodorant may be separated on the surface of the deodorant leather-like sheet in the form of the secondary particles to adversely affect the appearance or cause marked falling-off of the finely particulate deodorant, and the commercial value of the leather-like sheet deteriorates to a great degree. When the amount of the deodorant is less than 0.001 $g/cm^3$, it is difficult that the sufficient deodorizing effect is obtained.

When the deodorant of the photo-catalyst type is used, a great deodorizing effect can be exhibited by using the deodorant of the physical adsorption type in combination even under the condition such that the function of the photo-catalyst is not exhibited due to the absence of light. The relative amounts of the deodorant of the photo-catalyst type and the deodorant of the physical adsorption type are not particularly limited. The amount of the deodorant of the photo-catalyst type is, in general, 1 to 1,000 parts by mass and preferably 20 to 500 parts by mass per 100 parts by mass of the deodorant of the physical adsorption type. It is preferable that the deodorant of the photo-catalyst type and the deodorant of the physical adsorption type are present in the condition such that two types of the deodorants are mixed with each other. When the two types of the deodorants are present separately, i.e., the deodorant of the physical adsorption type is present singly, the function of adsorption alone is exhibited, and the deodorizing ability is decreased due to saturation. Therefore, such a condition is not preferable.

The deodorant of the physical adsorption adsorbs gases of the components of bad smell and works as the place of adsorption before the deodorant of the photo-catalyst type decomposes the components of bad smell. It is preferable that the deodorant of the photo-catalyst type is in the form of particles since the deodorant becomes a substance exhibiting the function of adsorption similarly to the deodorant of the physical adsorption type. The deodorant of the physical adsorption type is not particularly limited as long as the activity of the deodorant of the photo-catalyst type is not adversely affected, and a conventional adsorbent can be used. Examples of the deodorant of the physical adsorption type include phosphoric acid salts of tetravalent metals, hydroxides of divalent metals and titanium dioxide.

The process for making the deodorant present on base fabric of the leather-like sheet [1] or [2] is not particularly limited. It is preferable that the base fabric of the leather-like sheet is dipped into and impregnated with the fluid in which the deodorant is dispersed in a stage as late as possible so that the decrease in the deodorizing function in the finishing step is prevented and the deodorant is made present in the penetrating holes. The medium for dispersing the deodorant is not particularly limited as long as base fabric of the leather-like sheet [1] or [2] is not degenerated and the properties of the deodorant are not adversely affected. Water or water containing an alcohol as the penetrating agent, where necessary, is preferable. Surfactants may be added to prevent aggregation of the deodorant as long as the function of deodorant is not adversely affected. The concentration of the deodorant in the dispersion is preferably 0.01 to 30% by mass and more preferably 0.1 to 5% by mass from the standpoint of the deodorizing function and the post-treatment. It is preferable that the content of the fluid (the pickup fraction) is 30 to 90% by mass so that the deodorant is attached to the microfine fiber in a manner such that the deodorant covers the surface of the microfine fiber.

The deodorant leather-like sheet of the present invention exhibits the excellent deodorizing effect and the soft feel of touch in combination and can be advantageously used for clothes, interior furnishings, shoes, bags and various types of gloves.

EXAMPLES

The present invention will be described more specifically with reference to examples in the following. However, the present invention is not limited to the examples. In Examples and Comparative Example, "part" and "%" mean "part by mass" and "% by mass", respectively, unless otherwise mentioned.

The measurements of the surface area of a microfine fiber were conducted in accordance with the following procedures.

(1) The thickness of an obtained leather-like sheet was measured.

(2) The mass of the fiber per the unit area of a fiber-entangled fabric (a nonwoven fabric) was obtained. When substances other than the fiber such as an elastic polymer were contained, the substances were removed with a solvent, or the fiber was removed. When the fiber was removed, the mass of the fiber was obtained from the difference in the mass before and after the removal.

(3) The mass of the fiber per the unit volume was obtained by dividing the mass of the fiber obtained in (2) described above by the thickness obtained in (1) described above.

(4) The sectional area of the microfine fiber constituting the entangled nonwoven fabric was measured at arbitrarily selected 10 points using a scanning electron microscope, and the average value of the obtained values was obtained.

(5) Based on the specific gravity of the fiber constituting the leather-like sheet and the average sectional area obtained in (4) described above, the circumference of the sectional shape was converted into the circumference of the circle having the same area, and the surface area per 1 g of the fiber was obtained.

(From the specific gravity $\rho$ (g/cm$^3$) and the circumference of the circle ($\pi$R cm), calculated in accordance with the equation:

$$\pi R(\mathrm{cm})/\rho(\mathrm{g/cm^3})=\pi R/\rho(\mathrm{cm^2/g}))$$

(6) The surface area per the unit volume was obtained by multiplying the surface area obtained in (5) described above by the mass of the fiber obtained in (3) described above.

Since the sectional area of the fiber was much smaller than the area of the side face of the fiber, the area of the side face of the microfine fiber alone was used as the surface area of the microfine fiber in the present invention.

Example 1

Using a composite spinning apparatus, a sea/island fiber having an island component of 6-nylon and a sea component of a high fluidity low density polyethylene (the ratio of the amounts by volume of the sea component to the island component=40/60) was spun. The obtained sea/island fiber was drawn, crimped and cut, and staple fibers having a size of about 4 dtex and a cut length of 51 mm were obtained. The staple fibers were passed through a card and formed into webs in accordance with the crosslapper method, and the webs were laminated together. Using felt needles having a barb at one position, the laminate was needle punched at a punching density of 980 punches/cm$^2$, and a nonwoven fabric (a fiber-entangled fabric) having a unit weight of 450 g/m$^2$ was obtained.

After being heated, the nonwoven fabric was pressed to form a smooth surface, and the specific gravity of the nonwoven fabric was adjusted at 0.28. The resultant nonwoven fabric was impregnated with a 15% dimethylformamide (hereinafter, referred to as DMF) solution of a polyurethane, coagulated in an aqueous solution of DMF and washed with hot water. Polyethylene as the sea component in the fiber was removed by extraction with hot toluene, and a leather-like sheet comprising a fiber-entangled fabric comprising fiber bundles of a microfine fiber of 6-nylon having a size of about 0.05 dtex and the polyurethane (60% by mass based on the amount of the fiber-entangled fabric) and having a surface area of the microfine fiber of $5.3\times10^3$ cm$^2$/cm$^3$ per unit volume of the fiber-entangled fabric was obtained.

The obtained sheet was sliced into two sheets at the middle of the thickness. The face formed by the slicing was buffed with a sand paper to adjust the thickness of the sheet to 0.5 mm. The face opposite to the buffed face was treated by an emery buffing machine to form the face of napped fibers. The sheet was then dyed by dipping by a dyeing machine of the Wince type using the following metal complex dye of the 2:1 type:

Dye: Lanyl Blue BW (manufactured by SUMITOMO Chemical Co., Ltd.) 1.2%

Leveling agent: 1%

After the dyeing, the sheet was treated by soaping, washing with water and drying, and the resultant sheet was impregnated with a deodorant fluid comprising 15 parts of ATOMY-BALL TZ-R (manufactured by Catalysts & Chemicals Industries Co., Ltd.; a colloid supported on $TiO_2$—ZnO of the anatase type; the average diameter of the primary particles: 0.005 μm), 85 parts of water and 0.1 part of a penetrating agent in an amount such that the content of the liquid was 60% by mass.

After the resultant sheet was crumpled and the napped fibers were finished, a deodorant suede-type leather-like sheet having a thickness of 0.7 mm and a unit weight of 210 g/$m^2$ was obtained.

In the obtained deodorant suede-type leather-like sheet, the entire surface was covered with napped fibers of the microfine fiber, and the writing effect and the soft feel of touch as the characteristics of suede were exhibited without agglomeration of napped fibers. The sheet exhibited an elegant appearance having a blue color tone having transparency and depth. When the deodorant leather-like sheet was observed by an electron microscope, a portion of the deodorant was present in a manner such that the deodorant covered the surface of the fiber.

The deodorant property of the deodorant leather-like sheet was evaluated by the measurement in accordance with the method described in "the test for evaluation of the ability to remove gases and the property of discharging gases" by Japan Synthetic Textile Inspection Institute Foundation using hydrogen sulfide gas. The measurement was repeated for five days. The sheet had the sufficient deodorant property such that the concentration of the gas was decreased to one tenth of the initial concentration or smaller even after 5 days.

Example 2

Using a mix spinning apparatus, a sea/island fiber having an island component of 6-nylon and a sea component of a high fluidity low density polyethylene (the ratio of the amounts by volume of the sea component to the island component=50/50) was spun. The obtained fiber was treated in accordance with the same procedures as those conducted in Example 1, and a nonwoven fabric (a fiber-entangled fabric) having a unit weight of 450 g/$m^2$ was obtained.

After being heated, the nonwoven fabric was pressed to form a smooth surface, and the specific gravity of the nonwoven fabric was adjusted at 0.28. The resultant nonwoven fabric was impregnated with the 13% DMF solution, coagulated in an aqueous solution of DMF and washed with hot water. Polyethylene as the sea component in the fiber was removed by extraction with hot toluene, and a leather-like sheet comprising a fiber-entangled fabric comprising fiber bundles of a microfine fiber of 6-nylon having a size of about 0.04 dtex and the polyurethane (60% by mass based on the amount of the fiber-entangled fabric) and having a surface area of the microfine fiber of $1.8\times10^4$ $cm^2/cm^3$ per unit volume of the fiber-entangled fabric was obtained.

After the obtained sheet was treated in accordance with the same procedures as those conducted in Example 1, a deodorant suede-type leather-like sheet having a thickness of 0.7 mm and a unit weight of 220 g/$m^2$ was obtained.

In the obtained deodorant suede-type leather-like sheet, the entire surface was covered with napped fibers of the microfine fiber, and the writing effect and the soft feel of touch as the characteristics of suede were exhibited without agglomeration of napped fibers. The sheet exhibited an elegant appearance having a blue color tone having transparency and depth. When the deodorant leather-like sheet was observed by an electron microscope, a portion of the deodorant was present in a manner such that the deodorant covered the surface of the fiber.

The deodorant property of the deodorant leather-like sheet was evaluated in accordance with the same procedures as those conducted in Example 1. The sheet had the sufficient deodorant property such that the concentration of the gas was decreased to one tenth of the initial concentration or smaller even after 5 days.

Example 3

In accordance with the same procedures as those conducted in Example 1 except that a sea/island fiber having an island component of 6-nylon, a sea component of a high fluidity low density polyethylene (the ratio of the amounts by volume of the sea component to the island component=50/50) and about 3,500 islands was spun using a composite spinning apparatus, the unit weight of the unwoven fabric after being punched was 550 g/$m^2$, and the specific gravity after being pressed was 0.35, a deodorant suede-type leather-like sheet comprising a fiber-entangled fabric comprising fiber bundles of a microfine fiber of 6-nylon having an average single fiber fineness of about 0.0006 dtex and the polyurethane (45% by mass based on the amount of the fiber-entangled fabric) was obtained. The obtained deodorant suede-type leather-like sheet had a surface area of the microfine fiber of $5.7\times10^4$ $cm^2/cm^3$ per unit volume of the fiber-entangled fabric, a thickness of 0.7 mm and a unit weight of 260 g/$m^2$.

In the obtained deodorant suede-type leather-like sheet, the entire surface was covered with napped fibers of the microfine fiber, and the writing effect and the soft feel of touch as the characteristics of suede were exhibited without agglomeration of napped fibers. The sheet exhibited an elegant appearance having a blue color tone having transparency and depth. When the deodorant leather-like sheet was observed by an electron microscope, a portion of the deodorant was present in a manner such that the deodorant covered the surface of the fiber.

The deodorant property of the deodorant leather-like sheet was evaluated in accordance with the same procedures as those conducted in Example 1. The sheet had the sufficient deodorant property such that the concentration of the gas was decreased to one tenth of the initial concentration or smaller even after 5 days.

Example 4

In accordance with the same procedures as those conducted in Example 2 except that a sea/island fiber having an island component of 6-nylon, a sea component of a high fluidity low density polyethylene (the ratio of the amounts by volume of the sea component to the island component=40/60) and 180 islands was spun using a composite spinning apparatus, and the thickness after the buffing was 0.6 mm, a deodorant suede-type leather-like sheet comprising a fiber-entangled fabric comprising fiber bundles of a microfine fiber of 6-nylon having an average single fiber fineness of about 0.01 dtex and the polyurethane (45% by mass based on the amount of the fiber-entangled fabric) was obtained The obtained deodorant suede-type leather-like sheet had a surface area of the microfine fiber of $9.9\times10^3$ $cm^2/cm^3$ per unit volume of the fiber-entangled fabric, a thickness of 0.7 mm and a unit weight of 250 g/$m^2$.

In the obtained deodorant suede-type leather-like sheet, the entire surface was covered with napped fibers of the microfine fiber, and the writing effect and the soft feel of touch as the characteristics of suede were exhibited without agglomeration of napped fibers. The sheet exhibited an elegant appearance having a blue color tone having transparency and depth. When the deodorant leather-like sheet was observed by an electron microscope, a portion of the deodorant was present in a manner such that the deodorant covered the surface of the fiber.

The deodorant property of the deodorant leather-like sheet was evaluated in accordance with the same procedures as those conducted in Example 1. The sheet had the sufficient deodorant property such that the concentration of the gas was decreased to one tenth of the initial concentration or smaller even after 5 days.

Examples 5 and 6

In accordance with the same procedures as those conducted in Example 1, deodorant suede-type leather-like sheets having an average diameter of primary particles of 0.01 μm (Example 5) and 0.15 μm (Example 6), a thickness of 0.7 mm and a unit weight of 270 g/m$^2$ were obtained.

In the obtained deodorant suede-type leather-like sheets, the entire surface was covered with napped fibers of the microfine fiber, and the writing effect and the soft feel of touch as the characteristics of suede were exhibited without agglomeration of napped fibers. The sheets exhibited an elegant appearance having a blue color tone having transparency and depth. When the deodorant leather-like sheets were observed by an electron microscope, a portion of the deodorant was present in a manner such that the deodorant covered the surface of the fiber.

The deodorant property of the deodorant leather-like sheets was evaluated in accordance with the same procedures as those conducted in Example 1. The sheets had the sufficient deodorant property such that the concentration of the gas was decreased to one tenth of the initial concentration or smaller even after 5 days.

Comparative Example 1

In accordance with the same procedures as those conducted in Example 2 except that a sea/island fiber having an island component of 6-nylon, a sea component of a high fluidity low density polyethylene, a fineness of 5 dtex after being cut and 16 islands was spun using a composite spinning apparatus, a leather-like sheet comprising a fiber-entangled fabric comprising fiber bundles of a microfine fiber of 6-nylon having an average single fiber fineness of about 0.2 dtex and the polyurethane (50% by mass based on the amount of the fiber-entangled fabric) and having the surface area of the microfine fiber of 2.4×10$^3$ cm$^2$/cm$^3$ per unit volume of the fiber-entangle fabric was obtained. In accordance with the same procedures as those conducted in Example 4, a deodorant suede-type leather-like sheet having a thickness of 0.7 mm and a unit weight of 220 g/m$^2$ was obtained.

In the obtained deodorant suede-type leather-like sheet, the entire surface was covered with napped fibers of the microfine fiber having a greater diameter without agglomeration of the napped fibers, and the sheet exhibited an elegant appearance having a blue color tone having transparency and depth. However, the writing effect and the soft feel of touch as the characteristics of suede were inferior.

The deodorant property of the deodorant leather-like sheet was evaluated in accordance with the same procedures as those conducted in Example 1. The sheet exhibited the excellent deodorizing effect after 1 day, but the effect gradually decreased. After 3 days, the concentration of the gas was decreased only about one half of the initial concentration, and almost no deodorizing effect was found after 5 days.

Comparative Example 2

In accordance with the same procedures as those conducted in Example 1 except that another deodorant of the photo-catalyst type having a particle diameter of about 2 μm was used, a deodorant suede-type leather-like sheet having a thickness of 0.7 mm and a unit weight of 280 g/m$^2$ was obtained.

In the deodorant suede-type leather-like sheet, the layers in the sheet and napped fibers on the surface were fixed by adhesion with a binder, and the fibers were agglomerated. The writing effect as the characteristic of the suede was absent, and the feel was harsh.

The deodorant property of the deodorant leather-like sheet was evaluated in accordance with the same procedures as those conducted in Example 1. The sheet exhibited the excellent deodorizing effect after 1 day, but the effect gradually decreased. After 3 days, the concentration of the gas was decreased only about one half of the initial concentration, and almost no deodorizing effect was found after 5 days.

Comparative Example 3

In accordance with the same procedures as those conducted in Example 4 except that a sea/island fiber having an island component of 6-nylon, a sea component of a high fluidity low density polyethylene, a fineness of 5 dtex after being cut and 36 islands was spun using a composite spinning apparatus, the unit weight after being punched of the unwoven fabric was 300 g/m$^2$, the specific gravity after being pressed was adjusted to 0.16, and the concentration of the DMF solution of the polyurethane used for the impregnation was 25%, a deodorant suede-type leather-like sheet comprising a fiber-entangled fabric comprising fiber bundles of a microfine fiber of 6-nylon having an average single fiber fineness of about 0.09 dtex and the polyurethane (130% by mass based on the amount of the fiber-entangled fabric) was obtained. The obtained deodorant suede-type leather-like sheet had a surface area of the microfine fiber of 2.9×10$^3$ cm$^2$/cm$^3$ per unit volume of the fiber-entangled fabric, a thickness of 0.7 mm and a unit weight of 180 g/m$^2$.

In the obtained deodorant suede-type leather-like sheet, the entire surface was covered with napped fibers of the microfine fiber without agglomeration of napped fibers, and the sheet exhibited an elegant appearance having a blue color tone having transparency and depth. However, the writing effect and the soft feel of touch as the characteristics of suede were inferior.

The deodorant property of the deodorant leather-like sheet was evaluated in accordance with the same procedures as those conducted in Example 1. The sheet exhibited the excellent deodorizing effect after 1 day, but the effect gradually decreased. After 3 days, the concentration of the gas was decreased only about one half of the initial concentration, and almost no deodorizing effect was found after 5 days.

INDUSTRIAL APPLICABILITY

The deodorant suede-type leather-like sheet of the present invention exhibits excellent deodorizing effect for removing bad smell derived from sweat and smell of people, cigarettes and pet animals and has soft feel and appearance of the natural leather-like tone. Since the suede-type leather-like sheet of the present invention does not cause deterioration in the appearance (whitening) due to agglomeration of napped fibers or the presence of the deodorant, the sheet can be advantageously used for clothes, interior furnishings, shoes, bags and various types of gloves.

The invention claimed is:

1. An artificial suede sheet having deodorant properties comprising a fiber-entangled fabric, wherein:

the fiber-entangled fabric comprises at least one microfine fiber and a particulate deodorant;

a surface area of the at least one microfine fiber per unit volume of the fiber-entangled fabric is from $3\times10^3$ $cm^2/cm^3$ to $9\times10^4$ $cm^2/cm^3$;

at least a portion of the particulate deodorant is present on a surface of the at least one microfine fiber; and the particulate deodorant comprises particles having an average primary particle diameter of 0.1 μm or less.

2. The sheet according to claim 1, further comprising an elastic polymer, wherein:

the elastic polymer is impregnated into the fiber-entangled fabric; and the elastic polymer is present in an amount of from 0 to 150% by mass relative to a total mass of the fiber entangled fabric.

3. The sheet according to claim 1, wherein the fiber-entangled fabric comprises fiber bundles of the at least one microfine fiber.

4. The sheet according to claim 1, wherein the particulate deodorant comprises a photocatalyst.

5. The sheet according to claim 1, wherein at least a portion of the particulate deodorant covers a surface of the at least one microfine fiber.

6. The sheet according to claim 1, wherein the particulate deodorant is present in the fiber-entangled fabric in an amount of 0.001 to 0.05 $g/cm^3$ per unit volume of the fiber-entangled fabric.

7. The sheet according to claim 1, wherein at least one surface of the sheet comprises napped fibers.

8. The sheet according to claim 4, wherein the photocatalyst comprises an inorganic semiconductor.

9. The sheet according to claim 2, wherein at least one surface of the sheet comprises napped fibers.

* * * * *